United States Patent
Michitarian et al.

(10) Patent No.: US 12,266,136 B2
(45) Date of Patent: Apr. 1, 2025

(54) CALIBRATION ARRANGEMENT AND CALIBRATION METHOD

(71) Applicant: Harman Becker Automotive Systems GmbH, Karlsbad-Ittersbach (DE)

(72) Inventors: Artashes Michitarian, Oberschleißheim (DE); Damian Tomasz Kacperski, Łódź (PL); Nicola Piotto, Munich (DE)

(73) Assignee: HARMAN BECKER AUTOMOTIVE SYSTEMS GMBH, Karlsbad-Ittersbach (DE)

( * ) Notice: Subject to any disclaimer, the term of this patent is extended or adjusted under 35 U.S.C. 154(b) by 186 days.

(21) Appl. No.: 18/059,857

(22) Filed: Nov. 29, 2022

(65) Prior Publication Data

US 2023/0177725 A1  Jun. 8, 2023

(30) Foreign Application Priority Data

Dec. 8, 2021 (EP) .................................. 21213111

(51) Int. Cl.
*G06T 7/80* (2017.01)
*B60R 1/27* (2022.01)

(52) U.S. Cl.
CPC ............... *G06T 7/80* (2017.01); *B60R 1/27* (2022.01); *G06T 2207/30252* (2013.01)

(58) Field of Classification Search
CPC .................................................. G06T 7/08
See application file for complete search history.

(56) References Cited

U.S. PATENT DOCUMENTS

| | | | |
|---|---|---|---|
| 2019/0087977 A1* | 3/2019 | Kim ..................... | B60W 50/14 |
| 2019/0213756 A1* | 7/2019 | Chang .................. | G06V 20/56 |
| 2021/0350574 A1* | 11/2021 | Sours ................... | G09G 5/003 |

FOREIGN PATENT DOCUMENTS

| | | |
|---|---|---|
| CN | 109429013 A | 3/2019 |
| CN | 110766762 A | 2/2020 |

OTHER PUBLICATIONS

Krueger, L., 2007. Model based object classification and localisation in multiocular images. (Year: 2007).*
European Patent Office, Extended European Search Report Issued in Application No. 21213111.4, May 23, 2022, Germany, 11 pages.

* cited by examiner

*Primary Examiner* — Clifford Hilaire
(74) *Attorney, Agent, or Firm* — McCoy Russell LLP

(57) ABSTRACT

A calibration arrangement comprises a floor space configured to form a parking area for a vehicle, and a calibration pattern visible on the floor surrounding the floor space. A first portion of the calibration pattern is arranged on a first side of the floor space, and a second portion of the calibration pattern is arranged on a second side of the floor space, opposite the first side. Each of the first portion and the second portion of the calibration pattern comprises a plurality of identical first sub-patterns and a second sub-pattern different from the first sub-patterns. The first and second sides of the floor space have a first length. The first portion and the second portion of the calibration pattern each have a second length in a direction that is parallel to the first and second sides of the floor space, the second length being greater than the first length.

12 Claims, 3 Drawing Sheets

CALIBRATION ARRANGEMENT AND CALIBRATION METHOD

CROSS REFERENCE TO RELATED APPLICATIONS

The present application claims priority to European Patent Application No. 21213111.4, entitled "CALIBRATION ARRANGEMENT AND CALIBRATION METHOD", and filed on Dec. 8, 2021. The entire contents of the above-listed application is hereby incorporated by reference for all purposes.

TECHNICAL FIELD

The disclosure relates to a calibration arrangement and method, in particular to a calibration arrangement and method for a surround view system of a vehicle.

BACKGROUND

Many vehicles today comprise surround view systems. In a surround view system, a plurality of cameras is mounted on the vehicle. The cameras are configured to capture images of the surroundings of the vehicle. The captured images may be presented to a driver of the vehicle on a display or may be used for other driver assistance systems (e.g., Advanced Driver Assistance Systems, ADAS). Before delivering a vehicle comprising a surround view system, the surround view system needs to be calibrated, in order to ensure the correct functioning of the system.

SUMMARY

A calibration arrangement includes a floor space configured to form a parking area for a vehicle, and a calibration pattern visible on the floor surrounding the floor space, wherein a first portion of the calibration pattern is arranged on a first side of the floor space, and a second portion of the calibration pattern is arranged on a second side of the floor space, opposite the first side, each of the first portion and the second portion of the calibration pattern include a plurality of identical first sub-patterns and a second sub-pattern different from the first sub-patterns, the first side and the second side of the floor space have a first length, the first portion and the second portion of the calibration pattern each have a second length in a direction that is parallel to first side and the second side of the floor space, and the second length is greater than the first length.

A calibration method includes capturing a plurality of images by means of a plurality of cameras mounted at different positions on a vehicle, wherein the vehicle is arranged on the floor space of a calibration arrangement, and determining the orientation of each camera and the position of each camera with respect to the vehicle and with respect to the other cameras of the plurality of cameras arranged on the vehicle by evaluating the section of the calibration pattern captured by each camera.

Other systems, methods, features and advantages will be or will become apparent to one with skill in the art upon examination of the following detailed description and figures. It is intended that all such additional systems, methods, features and advantages be included within this description, be within the scope of the invention and be protected by the following claims.

BRIEF DESCRIPTION OF THE DRAWINGS

The arrangement may be better understood with reference to the following description and drawings. The components in the figures are not necessarily to scale, emphasis instead being placed upon illustrating the principles of the invention. Moreover, in the figures, like referenced numerals designate corresponding parts throughout the different views.

DETAILED DESCRIPTION

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It is recognized that directional terms that may be noted herein (e.g., "upper", "lower", "inner", "outer", "top", "bottom", etc.) simply refer to the orientation of various components of an arrangement as illustrated in the accompanying figures. Such terms are provided for context and understanding of the disclosed embodiments.

Figure 1:
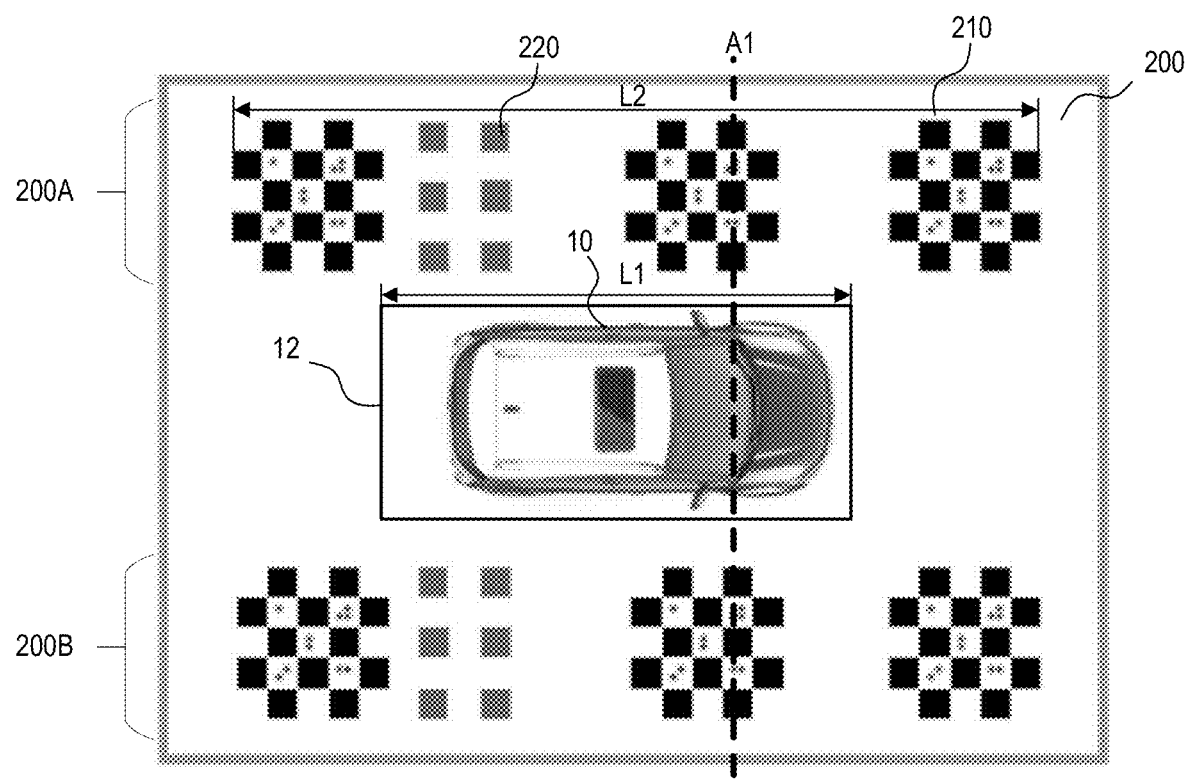
FIG. 1 schematically illustrates a calibration arrangement according to one example and a vehicle.

Referring to FIG. 1, a calibration arrangement according to one example is schematically illustrated. The calibration system may be used as an end-of-line calibration arrangement for surround view systems for vehicles. Surround view systems are used more and more to increase the safety of vehicles. In a surround view system, a plurality of cameras is mounted on a vehicle. The cameras are configured to capture images of the surroundings of the vehicle. The captured images may be presented to a driver of the vehicle on a display or may be used for other driver assistance systems (e.g., Advanced Driver Assistance Systems, ADAS). Before delivering a vehicle comprising a surround view system to an end user or a car dealer, the surround view system needs to be calibrated, in order to ensure the correct functioning of the system (end of line calibration). That is, for each camera of the surround view system, its exact orientation and position with respect to the vehicle and with respect to the other cameras of the surround view system needs to be known. This knowledge is needed, for example, if images captured by different cameras are to be stitched together to create a birds-eye view. For many other applications, an exact knowledge of the position and orientation of each camera may also be crucial.

A calibration arrangement comprises a floor space 12 configured to form a parking area for a vehicle 10. That is, while the calibration is performed, a vehicle 10 with a plurality of cameras mounted thereon is arranged on the dedicated floor space 12 (cameras not specifically illustrated in FIG. 1). The calibration arrangement further comprises a calibration pattern 200. The calibration pattern 200 may be visible on the floor surrounding a vehicle 10, when a vehicle is arranged on the dedicated floor space 12. The calibration pattern 200 may, e.g., be painted or projected on the floor surrounding the floor space 12. When the vehicle 10 is arranged on the floor space 12, each of the cameras on the vehicle 10 that are to be calibrated capture a part of the calibration pattern 200. The orientation of each camera and the position of each camera with respect to the vehicle 10 and the other cameras arranged on the vehicle 10 may be determined by evaluating the section of the calibration pattern 200 captured by each camera. This will be described in more detail with respect to FIGS. 4 and 5 below.

As is illustrated in FIG. 1, first portion 200A of the calibration pattern 200 is arranged on a first side of the floor space 12, and a second portion 200B of the calibration pattern 200 is arranged on a second side of the floor space 12, opposite the first side. The floor space 12 may have a rectangular form, for example. This generally resembles the overall shape of a vehicle. That is, the floor space 12 may comprise longitudinal sides (first and second side) and narrow sides. The first portion 200A is arranged along the first longitudinal side, and the second portion 200B of the calibration pattern 200 is arranged along the second longitudinal side of the floor space 12. That is, when a vehicle 10 is arranged on the floor space 12, the calibration pattern 200 is arranged along both sides of the vehicle 10. The areas in front of the vehicle 10 and at the rear of the vehicle 10 may remain free of the calibration pattern 200. This, however, is only an example. Generally it is also possible to arrange portions of the calibration pattern 200 in areas in front of the vehicle 10 and at the rear of the vehicle 10.

The first side and the second side of the floor space 12 have a first length L1. The first portion 200A and the second portion 200B of the calibration pattern 200 each have a second length L2 in a direction that is parallel to first side and the second side of the floor space 12, wherein the second length L2 is greater than the first length L1. That is, the first portion 200A and the second portion 200B of the calibration pattern 200 protrude beyond the floor space 12 towards the front as well as towards the rear of the vehicle 10, when a vehicle 10 is arranged on the floor space. In this way, front and rear facing cameras will always be able to capture at least a part of the calibration pattern 200 (see, e.g., FIGS. 4 and 5).

Each of the first portion 200A and the second portion 200B of the calibration pattern 200 comprise a plurality of identical first sub-patterns 210 and a second sub-pattern 220 different from the first sub-patterns 210. In the example illustrated in FIG. 1, each of the first portion 200A and the second portion 200B of the calibration pattern 200 comprise three identical first sub-patterns 210, and one second sub-pattern 220. The first and second sub-patterns 210, 220 are arranged one after the other in a line along the respective first or second side of the floor space 12. The second sub-patterns 220 may be arranged next to a rear of a vehicle 10, when a vehicle 10 is arranged on the floor space 12. Each of the second sub-patterns 220 may be arranged between two of the first sub-patterns 210. That is, at least one first sub-pattern 210 is arranged even more towards the rear of the vehicle 10 than the second sub-pattern 220. The first portion 200A of the calibration pattern 200 may be identical to the second portion 200B.

Figure 4:
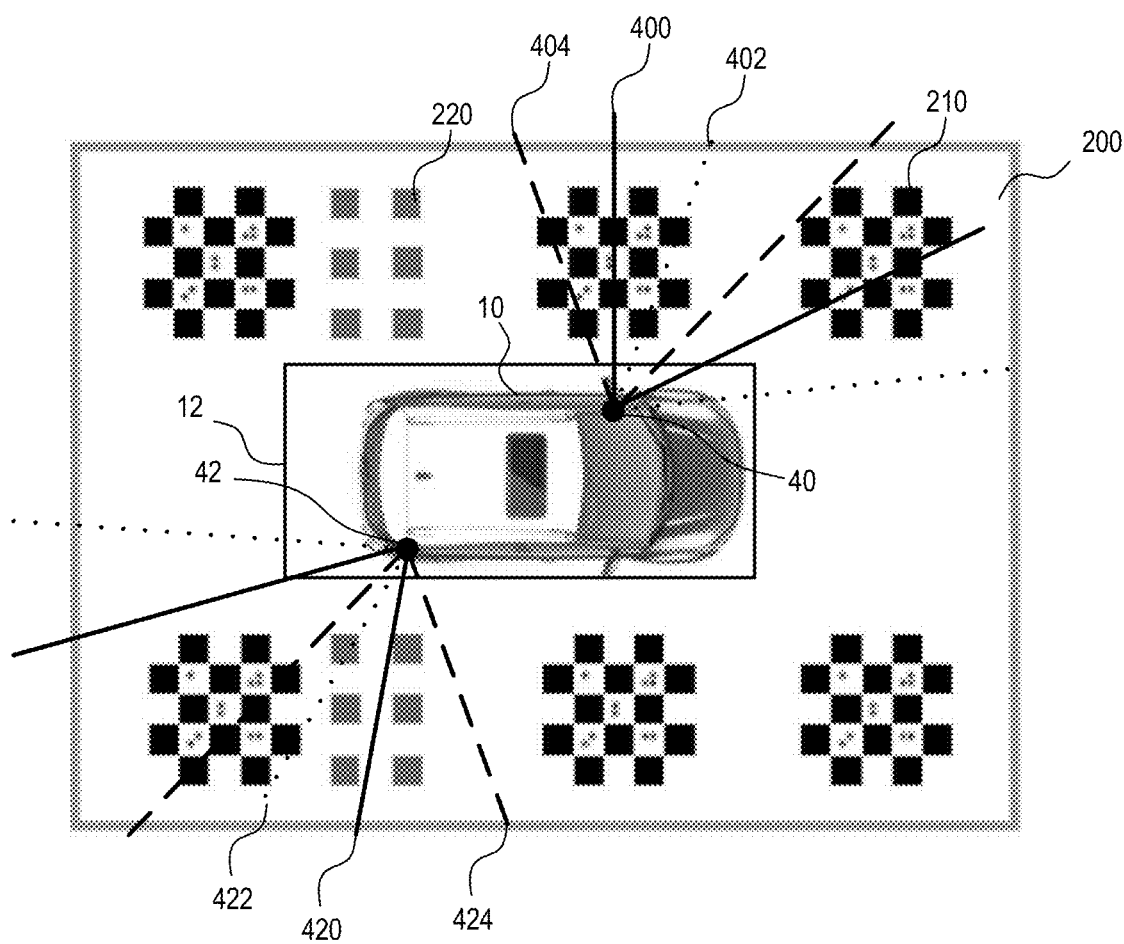
FIG. 4 schematically illustrates the general principle of the calibration arrangement according to one example.

Now referring to FIG. 4, each camera 40, 42 mounted on the vehicle 10 may capture a different section of the calibration pattern 200. In the example of FIG. 4, only two cameras 40, 42 are exemplarily illustrated. However, more than two cameras 40, 42, . . . , 4n may be mounted on the vehicle 10 at different positions. In the example of FIG. 4, a first camera 40 is arranged at a front left position of the vehicle 10, and a second camera 42 is arranged at a rear right position of the vehicle 10. Each camera 40, 42 may capture images of the surroundings of the vehicle 10 within a certain field of view. The field of view depends on the kind of camera that is used. Each camera 40, 42 is configured to capture images within a defined angle. This angle may be between 30° and 180°, for example. Angles of even more than 180°, however, are also possible. For example, one camera of the surround view system may be a 360° camera. The specific area that is visible within the field of view of a camera further depends on the orientation of the camera. This is illustrated by means of the solid lines, which illustrate a first field of view 400, 420 for each camera 40, 42 having a first orientation, the dotted lines, which illustrate a second field of view 402, 422 for each camera 40, 42 having a second orientation, and the dashed lines, which illustrate a third field of view 404, 424 for each camera 40, 42 having a third orientation. For each field of view, a different section of the calibration pattern 200 is visible. The section of the calibration pattern 200 that is captured by each camera 40, 42 may be evaluated in order to determine the position and orientation of each camera 40, 42.

Figure 2:
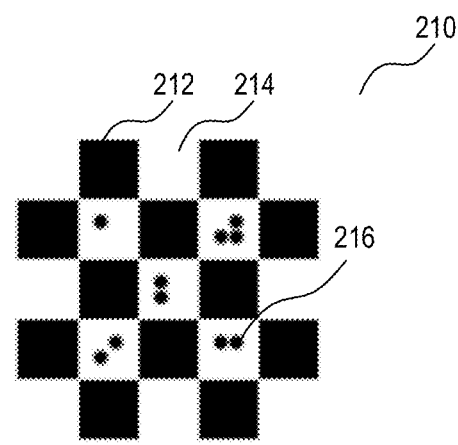
FIG. 2 schematically illustrates a sub-pattern of a calibration pattern of the calibration system, according to one example.

Now referring to FIG. 2, a first sub-pattern 210 of the calibration pattern 200 is exemplarily illustrated. Each of the plurality of first sub-patterns 210 may comprise a plurality of first shapes 212, 214 arranged in a regular pattern, and a plurality of second shapes 216 arranged in an irregular pattern. The plurality of first shapes may comprise a first sub-group 212 having a first color, and a second sub-group 214 having a second color. The first color may be black, and the second color may be white, for example. In this way, the contrast between the shapes of the first sub-group 212 and the shapes of the second sub-group may be ideal in order to be able to clearly identify the section of the calibration pattern 200 that is captured by each camera. Each of the plurality of first shapes 212, 214 may have a square shape, a rectangular shape, a round shape, a triangular shape, a polygonal shape, or an oval shape. Any other regular or irregular shape is also possible. In the example illustrated in FIG. 2, the plurality of first shapes 212, 214 have a square shape, wherein the first shapes of the first sub-group 212 and the first shapes of the second sub-group 214 are arranged in a chessboard pattern. That is, white and black squares are arranged alternatingly in rows and columns. Square shapes, for example, may be easier to detect and evaluate than other shapes. In a first sub-pattern 210 comprising only first shapes 212, 214, if a camera 40, 42 captures only a small part of the first sub-pattern 210, it may not be possible to determine which section of the first sub-pattern 210 is actually captured, as the first shapes 212, 214 are arranged in a regular pattern. Therefore, the first sub-pattern 210 further comprises second shapes 216 that are arranged in between the first shapes in an irregular pattern. In this way, each section of the first sub-pattern 210 may be clearly identified.

In the example illustrated in FIG. 2, each of the second shapes 216 is smaller than each of the first shapes 212, 214. The second shapes 216 may have a color that is different from the color of the first shapes 212, 214 they are arranged on. In this this way, the second shapes 216 are clearly visible on the first shapes 212, 214. According to one example, the second shapes 216 have either the first color or the second color. This may result in a very good contrast. In the example illustrated in FIG. 2, the second shapes 216 are black and have a round shape. This, however, is only an example. The second shapes 216 may have any suitable shape such as, e.g., a square shape, a rectangular shape, a round shape, a triangular shape, a polygonal shape, or an oval shape. Any other regular or irregular shape is also possible. A different sub-group of the second shapes 216 is arranged on each of the shapes of the second sub-group 214 that is fully encircled by shapes of the first sub-group 212. In the example illustrated in FIG. 2, second shapes 216 are arranged on the first shapes of the second sub-group 214 arranged at the edge of the first sub-pattern 210. This, however, is only an example. It is possible to arrange a sub-group of second shapes 216 on only some, or on all of the first shapes of the second sub-group 214. The black circles which form the second shapes 216 are clearly visible on the white shapes of the second sub-group 214. It is, however, also possible to arranged white circles on the black shapes of the first sub-group 212 instead or in addition. Each sub-group of the second shapes 216 differs from every other sub-group of the second shapes 216 either by means of the number of second shapes 216, or by means of a pattern formed by the second shapes 216 of the respective sub-group of second shapes 216, or both. For example, a sub-group may be formed by a single second shape, by two or more second shapes 216 arranged in one vertical, horizontal, or diagonal row or column, or by three or more second shapes 216 arranged in any other regular or irregular way. Each sub-group of second shapes 216, however, may clearly differ from every other sub-group of second shapes 216 of the same first sub-pattern 210.

As is schematically illustrated in FIG. 1, the front axle of a vehicle 10 that is arranged on the floor space 12 for calibration may be arranged at a defined position (on a defined line) A1 with respect to the calibration pattern 200. Generally, each vehicle 10 arranged on the floor space 12 may also be positioned and aligned in other directions (e.g., lateral direction that is perpendicular to the longitudinal sides of the floor space 12). One objective of the calibration arrangement and method disclosed herein is to localize a vehicle 10 within a coordinate system of the calibration pattern 200. Usually, the surround view systems of different kinds of vehicles are calibrated using the same calibration arrangement. Different kinds of vehicles, however, may have different dimensions. That is, some vehicles may be shorter, narrower, lower, while others may be longer, broader, higher. The length of the hoods of different kinds of vehicles may differ to a certain degree. However, the differences of the lengths of the vehicles from the front axis to the rear of the vehicle are generally considerably greater.

Figure 5:
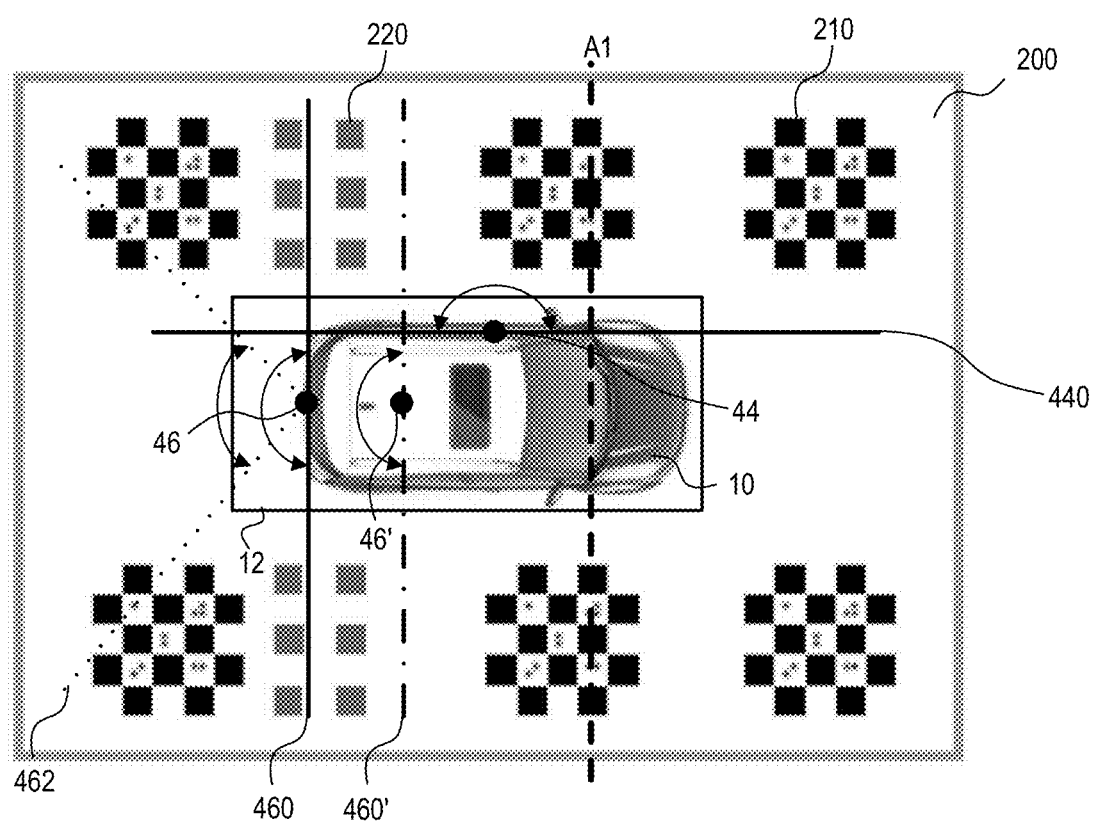
FIG. 5 schematically illustrates the general principle of the calibration arrangement according to another example.

Rear view cameras 46, 46' for vehicles 10 having different lengths are schematically illustrated in FIG. 5. The position and field of view for a 180° rear view camera 46 on a comparably long vehicle 10 is indicated by the respective dot 46 and solid line 460, while the position and field of view for a 180° rear view camera 46' on a comparably short vehicle 10 is indicated by the respective dot 46' and the dot-dashed line 460'. The dotted lines 462 indicate the field of view of a rear view camera 46 mounted on a comparably long vehicle 10 but having a field of view of less than 180°. For a rear view camera 46' mounted on a short vehicle 10, some sections of the calibration pattern 200 may be comparably far away and, therefore, may be poorly visible or not visible at all for the camera 46'. Such cameras 46', however, may capture parts of the second sub-patterns 220.

Figure 3:
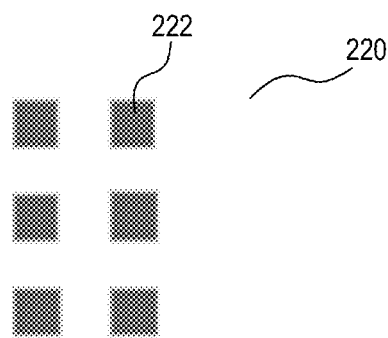
FIG. 3 schematically illustrates another sub-pattern of a calibration pattern of the calibration system, according to one example.

A second sub-pattern 220 is exemplarily illustrated in FIG. 3. Each of the second sub-patterns 220 may comprise a plurality of third shapes 222 arranged in a regular pattern, for example. The regular pattern of the second sub-patterns 220, however, differs from the regular pattern of the first sub-patterns 210. In the example illustrated in FIG. 3, each third shape 222 is arranged distant from every other third shape 222 of the same second sub-pattern 220. That is, the third shapes 222 do not form a chessboard pattern, as they do not directly contact each other. Each third shape 222 may have a square shape, a rectangular shape, a round shape, a triangular shape, a polygonal shape, or an oval shape. Any other regular or irregular shape is also possible. In the example illustrated in FIG. 3, the third shapes 222 have a square shape and are arranged in lines and columns. Other regular arrangements, however, are also possible. When the third shapes 222 are clearly separated from each other by means of white sections, the third shapes 222 may be easily detected, as the contrast is comparably good.

The third shapes 222 may have a third color that is different from the first color and the second color. The third color may be one of blue, red, green, yellow, cyan, or magenta, for example. The mentioned colors are primary colors or colors of the CMYK color model. In this way it is possible to completely mask out the second sub-patterns 220, if needed. For example, for longer vehicles 10 it may not be necessary to consider the second sub-patterns 220 at all. This is, because they capture at least a small section of the first sub-patterns 210 arranged towards the rear of the vehicle 10. The respective color channel of the second sub-patterns 220 may therefore be filtered out during the calibration process. In this way, the entire second sub-patterns 220 may be masked out. For shorter vehicles 10, on the other hand, where the first sub-patterns 210 arranged at the rear of the vehicle 10 (very left first sub-patterns 210 in FIG. 5) are poorly visible or even not visible at all for the rear view camera 46', or for any other camera mounted on the vehicle 10, the second sub-patterns 220 may not be masked out and may be used during the calibration process. It is possible, that the second sub-patterns 220 are masked out during the calibration process of some (e.g., rear view cameras 46'), but not all cameras 40, 42, . . . , 4n of a vehicle 10.

Filtering out the second sub-patterns 220 having a third color that is different from the first and the second color of the first sub-patterns 210, however, is only one example. The different color of the second sub-patterns 220 may also be used for a simple and easy segmentation. Segmentation of the second sub-patterns 220 allows for the use of a completely different detection method, as compared to the detection method described above. An alternative method may be based on color segmentation and may be used, for example, if the standard geometric based detection method as has been described above fails for any reason.

In FIG. 5, a side view camera 44 having a field of view 440 of 180° is also exemplarily illustrated. The side view camera 44 in this example captures the entire first portion 200A of the calibration pattern 200. A similar side view camera could be arranged on the opposite side of the vehicle 10, for example. This, however, is only an example. As has been described above with respect to FIG. 4, cameras 40, 42, . . . , 4n having a field of view of less than 180° may also be used in surround view or other driver assistance systems of a vehicle 10. The cameras 40, 42, . . . , 4n may be arranged in any suitable position on the vehicle 10. Therefore, depending on the camera 40, 42, . . . , 4n mounted on the vehicle 10 and its specific position, the entire first portion 200A (or second portion 200B) may be visible on the captured images, or only part of it.

The calibration arrangement described above allows to calibrate camera systems of different vehicle types, independent of the length, width, or height of the individual vehicle. It is not necessary for each camera 40, 42, ..., 4n mounted on the respective vehicle 10, to capture the entire calibration pattern 200, or an entire portion (e.g., entire first portion 200A or entire second portion 200B). Even if only a small section of the calibration pattern 200 is captured by a camera 40, 42, ..., 4n (e.g., only two squares of one of the plurality of first sub-patterns 210 are captured), it is still possible to estimate the position of the respective camera 40, 42, ..., 4n on the vehicle 10 and with respect to the other cameras 40, 42, ..., 4n, as well as its rotation and translation. The position of each camera 40, 42, ..., 4n on the vehicle is generally roughly known before performing the calibration process. That is, for each camera 40, 42, ..., 4n it may be know whether it is in a front left/right, rear left/right position, etc. The positions, however, are not known precisely before the calibration process. That is, the positions may vary by several millimeters or even centimeters. The exact position may be determined by means of the calibration process. Even further, it is possible to estimate the ground plane location by means of the calibration process (i.e., the height of the cameras with respect to the ground). The calibration arrangement described herein is very robust, even if the dimensions of the vehicles 10 arranged on the floor space 12 vary.

The calibration pattern 200 may not be fully visible for a camera 40, 42, ..., 4n during the calibration process for any other reasons than the position and orientation of the camera 40, 42, ..., 4n. The calibration method described herein, however, is also very robust if, for example, the calibration pattern 200 is partly covered by a large vehicle for which a calibration process is to be performed, by any objects that have been unintentionally left on the pattern, or by any persons that are present during the calibration process. The calibration process, when using the calibration pattern 200 described herein, is also very robust if the calibration pattern 200 is stained or dirty, if the light conditions during the calibration process are weak, or if the detection of the calibration pattern 200 is disturbed in any other way. In many cases, parts of the calibration pattern 200 may not be visible, even if the concerned section of the calibration pattern 200 is captured by one or more cameras 40, 42, ..., 4n. It may even happen that one or more cameras 40, 42, ..., 4n only capture a small section of the calibration pattern 200. However, with the calibration pattern 200 as described herein, it is still possible to perform a sufficiently accurate calibration process if only very small sections of the calibration pattern 200 are visible for a camera 40, 42, ..., 4n. For example, especially in cases where only small parts of the calibration pattern 200 are visible, homography, full pattern fitting, or any other suitable techniques may be used to detect the calibration pattern 200 and prevent the calibration process from failing.

For example, when using the calibration arrangement described herein, if a camera 40, 42, ..., 4n detects only a small section of on ore more of the first sub-patterns 210 (or the second sub-pattern 220), it is possible to use a suitable model to extrapolate from the detected section on the locations of the remaining sections of the calibration pattern 200. For example, corner based pixel refinement techniques may be used to localize the corners of the different squares that are detected. The positions of the corners of those squares that are not visible in the captured images, e.g., may be extrapolated from the detected corners by leveraging the pattern geometry and further homography transformation.

During the calibration process, the squares (shapes) detected by each camera 40, 42, ..., 4n may be estimated with regard to an exact model of the calibration pattern 200, for estimating the camera locations with respect to each other, and with respect to the ground plane, for example. That is, an exact model of the calibration pattern 200 should be known to a processing unit performing the calibration.

The invention claimed is:

1. A calibration arrangement, comprising:
a floor space configured to form a parking area for a vehicle; and
a calibration pattern visible on a floor surrounding the floor space; wherein
a first portion of the calibration pattern is arranged on a first side of the floor space, and a second portion of the calibration pattern is arranged on a second side of the floor space opposite the first side;
each of the first portion and the second portion of the calibration pattern comprises a plurality of identical first sub-patterns and a second sub-pattern different from the first sub-patterns;
the first side and the second side of the floor space have a first length;
each of the first portion and the second portion of the calibration pattern has a second length in a direction that is parallel to the first side and the second side of the floor space; and
the second length is greater than the first length, wherein
each of the plurality of identical first sub-patterns comprises a plurality of first shapes arranged in a regular pattern, and a plurality of second shapes arranged in an irregular pattern, wherein
the plurality of first shapes comprises a first sub-group having a first color, and a second sub-group having a second color, wherein the first color differs from the second color, and wherein
each of the first shapes of the first sub-group is black and has a square shape,
each of the first shapes of the second sub-group is white and has a square shape,
each of the second shapes is black and has a round shape,
the first shapes of the first sub-group and the first shapes of the second sub-group are arranged in a chessboard pattern, and
a different sub-group of the second shapes is arranged on each of the shapes of the second sub-group that is fully encircled by shapes of the first sub-group.

2. The calibration arrangement of claim 1, wherein each of the plurality of first shapes has one of: a square shape, a rectangular shape, a round shape, a triangular shape, a polygonal shape, and an oval shape.

3. The calibration arrangement of claim 1, wherein a size of each of the plurality of second shapes is smaller than a size of each of the plurality of first shapes.

4. The calibration arrangement of claim 1, wherein each of the plurality of second shapes has one of: the first color, and the second color.

5. The calibration arrangement of claim 1, wherein each sub-group of the second shapes differs from every other sub-group of the second shapes either by at least one of: a number of second shapes; and a pattern formed by the second shapes of the respective sub-group of second shapes.

6. The calibration arrangement of claim 1, wherein the calibration pattern is painted or projected on the floor surrounding the floor space.

7. A calibration arrangement, comprising:
a floor space configured to form a parking area for a vehicle; and a calibration pattern visible on a floor surrounding the floor space; wherein a first portion of the calibration pattern is arranged on a first side of the floor space, and a second portion of the calibration pattern is arranged on a second side of the floor space opposite the first side;

each of the first portion and the second portion of the calibration pattern comprises a plurality of identical first sub-patterns and a second sub-pattern different from the first sub-patterns;

the first side and the second side of the floor space have a first length;

each of the first portion and the second portion of the calibration pattern has a second length in a direction that is parallel to the first side and the second side of the floor space; and the second length is greater than the first length, wherein each of the second sub-patterns comprises a plurality of third shapes arranged in a regular pattern, and wherein each of the plurality of second shapes has one of: the first color, and the second color, wherein the third shapes have a third color that is different from the first color and the second color, wherein the third color is one of: blue, red, green, yellow, and magenta.

8. The calibration arrangement of claim 7, wherein each third shape is arranged distant from every other third shape of the same second sub-pattern.

9. The calibration arrangement of claim 7, wherein each third shape has a square shape, a rectangular shape, a round shape, a triangular shape, a polygonal shape, or an oval shape.

10. The calibration arrangement of any of claim 9, wherein the third shapes have a square shape, and are arranged in lines and columns.

11. A calibration method, comprising:

capturing a plurality of images by means of a plurality of cameras mounted at different positions on a vehicle wherein the vehicle is arranged on a floor space of a calibration arrangement, the floor space being configured to form a parking area for the vehicle, and a calibration pattern of the calibration arrangement being visible on a floor surrounding the floor space; and determining an orientation of each camera and a position of each camera with respect to the vehicle and with respect to the other cameras of the plurality of cameras arranged on the vehicle by evaluating a section of the calibration pattern captured by each camera; wherein a first portion of the calibration pattern is arranged on a first side of the floor space, and a second portion of the calibration pattern is arranged on a second side of the floor space opposite the first side;

each of the first portion and the second portion of the calibration pattern comprises a plurality of identical first sub-patterns and a second sub-pattern different from the first sub-patterns;

the first side and the second side of the floor space have a first length;

each of the first portion and the second portion of the calibration pattern has a second length in a direction that is parallel to the first side and the second side of the floor space; and the second length is greater than the first length, wherein each of the plurality of identical first sub-patterns comprises a plurality of first shapes arranged in a regular pattern, and a plurality of second shapes arranged in an irregular pattern, wherein the plurality of first shapes comprises a first sub-group having a first color, and a second sub-group having a second color, wherein the first color differs from the second color, and wherein each of the first shapes of the first sub-group is black and has a square shape, each of the first shapes of the second sub-group is white and has a square shape, each of the second shapes is black and has a round shape, the first shapes of the first sub-group and the first shapes of the second sub-group are arranged in a chessboard pattern, and a different sub-group of the second shapes is arranged on each of the shapes of the second sub-group that is fully encircled by shapes of the first sub-group.

12. A calibration method, comprising:

capturing a plurality of images by means of a plurality of cameras mounted at different positions on a vehicle wherein the vehicle is arranged on a floor space of a calibration arrangement, the floor space being configured to form a parking area for the vehicle, and a calibration pattern of the calibration arrangement being visible on a floor surrounding the floor space; and determining an orientation of each camera and a position of each camera with respect to the vehicle and with respect to the other cameras of the plurality of cameras arranged on the vehicle by evaluating a section of the calibration pattern captured by each camera; wherein a first portion of the calibration pattern is arranged on a first side of the floor space, and a second portion of the calibration pattern is arranged on a second side of the floor space opposite the first side;

each of the first portion and the second portion of the calibration pattern comprises a plurality of identical first sub-patterns and a second sub-pattern different from the first sub-patterns;

the first side and the second side of the floor space have a first length;

each of the first portion and the second portion of the calibration pattern has a second length in a direction that is parallel to the first side and the second side of the floor space; and the second length is greater than the first length, wherein each of the second sub-patterns comprises a plurality of third shapes arranged in a regular pattern, and wherein each of the plurality of second shapes has one of: the first color, and the second color, wherein the third shapes have a third color that is different from the first color and the second color, wherein the third color is one of: blue, red, green, yellow, and magenta.

* * * * *